United States Patent
Cai et al.

(10) Patent No.: US 11,880,233 B2
(45) Date of Patent: Jan. 23, 2024

(54) ELECTRONIC DEVICE

(71) Applicant: Lenovo (Beijing) Limited, Beijing (CN)

(72) Inventors: Shuhui Cai, Beijing (CN); Jinshan Chen, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/687,468

(22) Filed: Mar. 4, 2022

(65) Prior Publication Data
US 2023/0056963 A1 Feb. 23, 2023

(30) Foreign Application Priority Data
Aug. 23, 2021 (CN) .......................... 202110969202.7

(51) Int. Cl.
*G06F 1/16* (2006.01)
(52) U.S. Cl.
CPC .................................. *G06F 1/1601* (2013.01)
(58) Field of Classification Search
CPC ..................................................... G06F 1/1601
See application file for complete search history.

(56) References Cited

U.S. PATENT DOCUMENTS

| | | | | |
|---|---|---|---|---|
| 7,652,873 B2* | 1/2010 | Lee | ....................... | G06F 1/1681 |
| | | | | 248/920 |
| 10,303,212 B2* | 5/2019 | Wang | ..................... | G06F 1/1683 |
| 11,226,651 B2* | 1/2022 | Chen | ...................... | G06F 1/165 |
| 11,378,225 B2* | 7/2022 | Laurent | ................ | F16M 11/105 |
| 11,397,448 B2* | 7/2022 | Liu | ....................... | G06F 1/1681 |
| 2013/0057776 A1* | 3/2013 | Yamaguchi | ........... | G06F 1/1601 |
| | | | | 348/731 |
| 2014/0016257 A1* | 1/2014 | Matsuoka | ................ | H05K 5/03 |
| | | | | 361/679.01 |
| 2014/0192469 A1* | 7/2014 | Chang | ................... | G06F 1/1658 |
| | | | | 361/679.09 |
| 2015/0036277 A1* | 2/2015 | Yukawa | ............... | H01Q 1/2266 |
| | | | | 343/702 |
| 2018/0070472 A1* | 3/2018 | Aiello | ................ | H05K 7/20145 |
| 2019/0227602 A1* | 7/2019 | Trim | ..................... | G06F 1/1677 |

* cited by examiner

*Primary Examiner* — Rockshana D Chowdhury
(74) *Attorney, Agent, or Firm* — ANOVA LAW GROUP, PLLC

(57) ABSTRACT

An electronic device. The electronic device includes a host having a first body and a second body, and a display screen rotatably connected to the host and configured to display to-be-output content output by the host, the display screen being rotatably connected to the host through the first body or the second body.

12 Claims, 5 Drawing Sheets

ELECTRONIC DEVICE

CROSS-REFERENCES TO RELATED APPLICATION

This application claims priority to Chinese Patent Application No. 202110969202.7 filed on Aug. 23, 2021, the entire content of which is incorporated herein by reference.

FIELD OF TECHNOLOGY

The present disclosure relates to the technical field of electronic devices and, more specifically, to an electronic device.

BACKGROUND

At present, the host part of electronic devices such as computers (such as the chassis of a desktop computer, the part with a keyword of a laptop computer, the body of a tablet computer, etc.) is generally an integrated structure. This structure is relatively simple, and the shape is relatively fixed, which cannot meet the various needs of users.

BRIEF SUMMARY OF THE DISCLOSURE

One aspect of the present disclosure provides an electronic device. The electronic device includes a host having a first body and a second body, and a display screen rotatably connected to the host and configured to display to-be-output content output by the host. The display screen is rotatably connected to the host through the first body or the second body.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

REFERENCE NUMERALS

Figure 1:
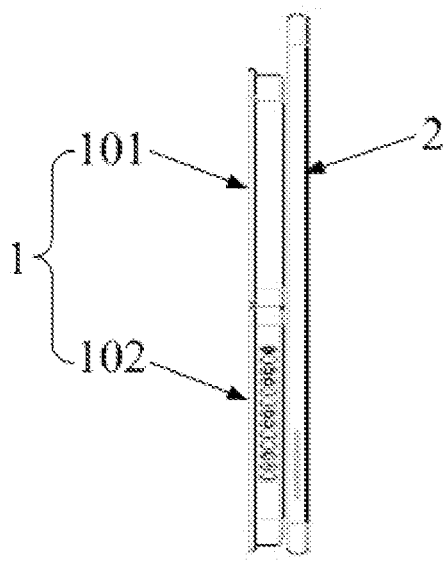
FIG. 1 is a side view of a host and a display screen of an electronic device according to an embodiment of the present disclosure.

1 Host
2 Display screen
3 Rotating shaft
4 Limiting part
5 First locking piece
6 Second locking piece
7 Base
101 First body
102 Second body
701 Bottom plate
702 Connecting body

DETAILED DESCRIPTION

The present disclosure provides an electronic device, which has a novel structure and shape, and can meet the various usage needs of users.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As shown in FIG. 1 to FIG. 6, an embodiment of the present disclosure provides an electronic device. The electronic device can be a computer, such as a learning computer suitable for students' online classes, which mainly includes a host 1 and a display screen 2. The host 1 may be the part that controls the operation of the electronic device. In the present disclosure, the host 1 is divided into a plurality of different parts, such that the host 1 includes at least a first body 101 and a second body 102, and the first body 101 and the second body 102 may be rotatably connected. The display screen 2 may be used to display the content to be outputted by the host 1 and may be arranged on the host 1, such that the host 1 can support the display screen 2. When the host 1 includes at least the first body 101 and the second body 102, the display screen 2 may be arranged on the first body 101 or the second body 102. When the electronic device is in use, the first body 101 and the second body 102 may be arranged in a top-down arrangement. More specifically, the first body 101 of the two bodies may be positioned at the top, and the second body 102 may be positioned at the bottom of the first body 101. When the display screen 2 is disposed on the first body 101 on the top, the display screen 2 may be jointly supported by the first body 101 and the second body 102. In addition, due to the rotational connection between the two bodies, when the first body 101 and the second body 102 rotate relatively to each other, the display screen 2 disposed on the first body 101 may rotate relatively to the second body 102, and a supporting surface supporting the second body 102 (the supporting surface may be a desktop or the ground, and the second body 102 may be fixed relative to the supporting surface). In this way, the position adjustment of the display screen 2 can be realized through the attitude adjustment of the host 1, such that the display screen 2 can be displayed in different positions. Alternatively, the display screen 2 may also be disposed on the second body 102 at the bottom, such that the host 1 can also support the display screen 2. At the same time, when the display screen 2 is disposed on the host 1, the display screen 2 may also be rotatably connected to the host 1. That is, the display screen 2 may be rotated on the second body 102 or the second body 102, such that the display screen 2 can also perform attitude adjustment (e.g., switching between a horizontal screen and a vertical screen or changing the pitch angle of the display screen 2). In this way, the display screen 2 can be displayed in a plurality of different positions and can also be displayed in different attitudes.

In the structure of the electronic device described above, when the display screen 2 is being supported by the host 1, the host 1 is divided into different parts such that the different parts can be rotated relative to each other and the display screen 2 can be rotated relative to the host 1, the display screen 2 can not only have a variety of different attitudes, but can also be in different positions under the drive of the host 1, thereby meeting the various usage needs of users. A specific usage scenario may be as follow. When a student uses the electronic device described above for an online class, after placing the electronic device on the desktop, the host 1 supports the display screen 2, and the first body 101 and the second body 102 can rotate relatively to each other such that the position of the display screen 2 can be adjusted. That is, the display screen 2 can be switched between the horizontal screen and the vertical screen or the pitch angle can be changed (the choice of these two attitude adjustment methods may be determined by an arrangement of a first rotating shaft mechanism rotatably connected to the display screen 2, which will be described in the following description), such that the student can take the online class in a more suitable position and attitude. Compared with the conventional technology of using electronic devices with different shapes and functions such as desktop computers, laptop computers, and tablet computers to take online classes, the electronic device described above is more suitable for the use of online classes, and can better meet the needs of online classes.

Figure 5:
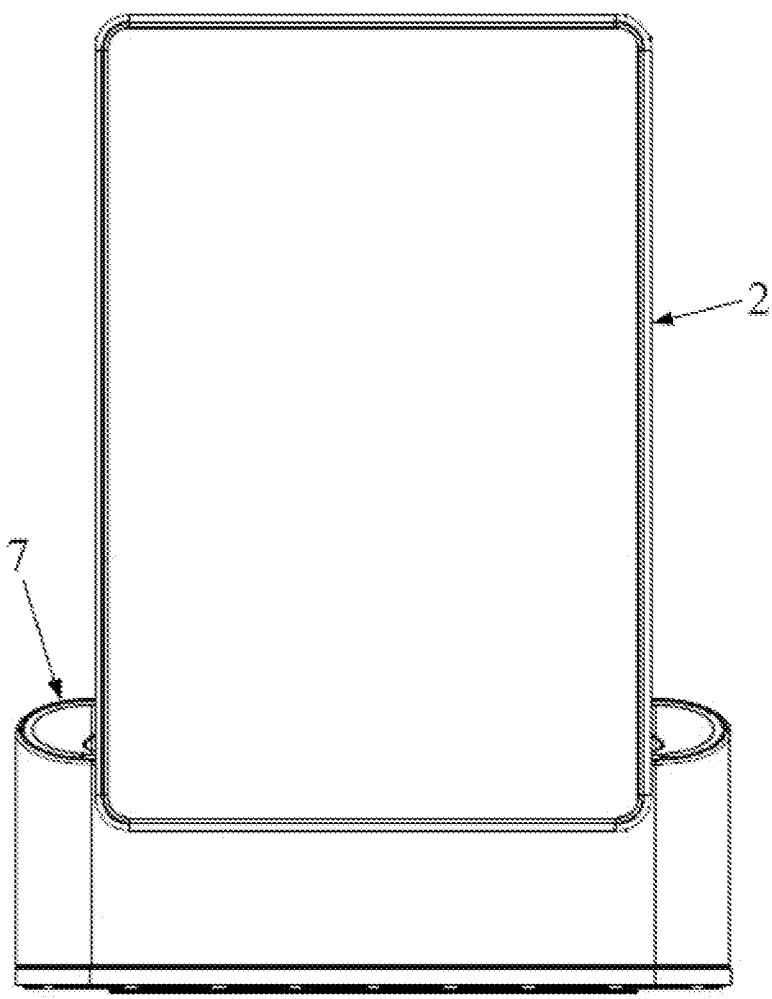
FIG. 5 is a right side view of FIG. 4.
Figure 6:
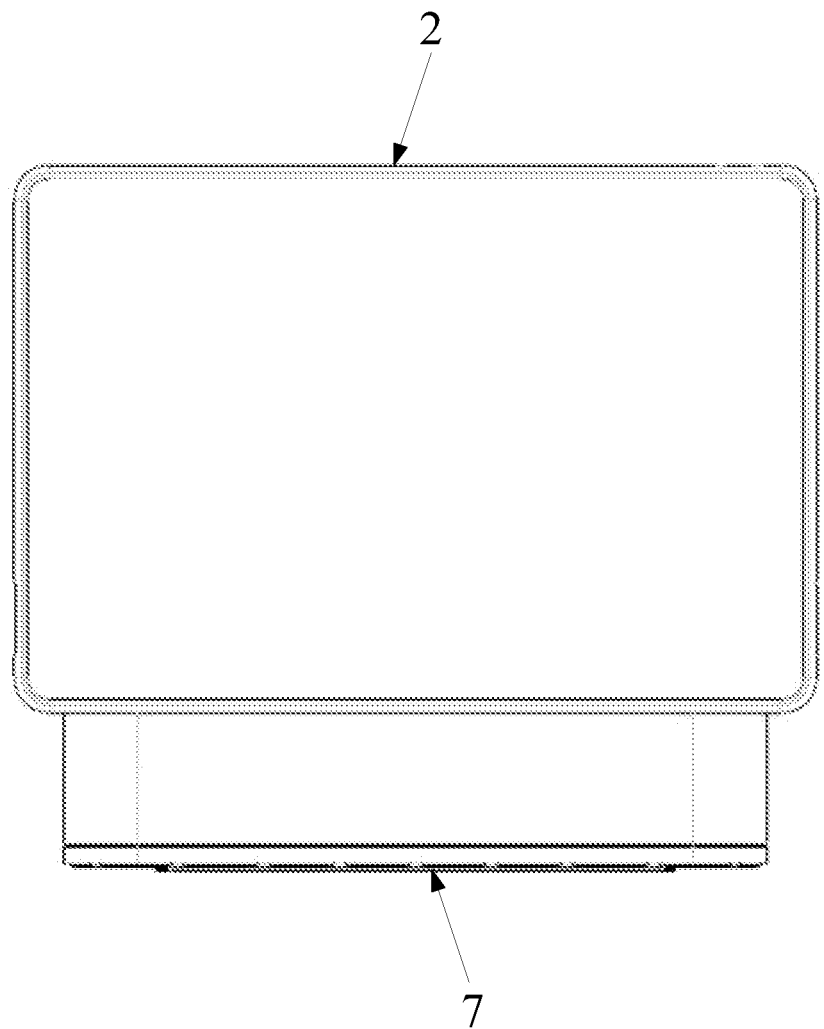
FIG. 6 is a front view of the electronic device when the display screen is in a landscape orientation.

In some embodiments, the host 1 and the display screen 2 may be rotatably connected through a first rotating shaft mechanism, and an axis of the first rotating shaft mechanism and the display screen 2 may satisfy a perpendicular condition. The first body 101 and the second body 102 may be rotatably connected by a second rotating shaft mechanism, and an axis of the second rotating shaft mechanism and the display screen 2 may satisfy a parallel condition. In some embodiments, the first body 101 and the second body 102 of the host 1 may be rotatably connected by using the first rotating shaft mechanism, and the axis of the second rotating shaft mechanism and the display screen 2 may satisfy the perpendicular condition. Satisfying the perpendicular condition may be that the axis of the first rotating shaft mechanism is perpendicular or substantially perpendicular to a plane (or the display surface of the display screen 2) on which the display screen 2 is positioned. That is, the display screen 2 may rotate around the axis that is perpendicular to the display screen 2, such that the display screen 2 can be rotated in the plane where it is positioned. In this way, the attitude of the display screen 2 can be changed. For example, when the shape of the display screen 2 is a rectangle, as shown in FIG. 5 and FIG. 6, this rotation can make the display screen 2 switch between the horizontal screen and the vertical screen, thereby meeting the needs of different scenarios. For example, as shown in FIG. 5, when browsing vertically distributed web pages or images, the display screen 2 can be switched to a vertical screen attitude. In another example, as shown in FIG. 6, when watching a video, the display screen 2 can be switched to a horizontal screen attitude. In addition, the first rotating shaft mechanism may also be arranged differently to realize the various adjustments of the display screen 2. For example, the axis of the first rotating shaft mechanism may be set parallel to the display screen 2, such that the display screen 2 may rotate around the axis of the parallel to the display screen 2, thereby realizing the adjustment of the pitch angle of the display screen 2. In some embodiments, the first body 101 and the second body 102 of the host 1 may be rotatably connected by using the second rotating shaft mechanism, and the axis of the second rotating shaft mechanism and the display screen 2 may satisfy the parallel condition. Satisfying the parallel condition may be that the axis of the second rotating shaft mechanism is parallel or substantially parallel to a plane (or the display surface of the display screen) on which the display screen 2 is positioned. In this way, the display screen 2 can be moved and/or rotated around the axis parallel to it under the drive of the host 1, such that the position of the display screen 2 can be changed. For the specific structures of the first rotating shaft mechanism and the second rotating shaft mechanism, on the basis that there are no other usage requirements, the first rotating shaft mechanism and the second rotating shaft mechanism may both be conventional rotating shaft mechanisms, and reference can be made to the related technologies.

Figure 3:
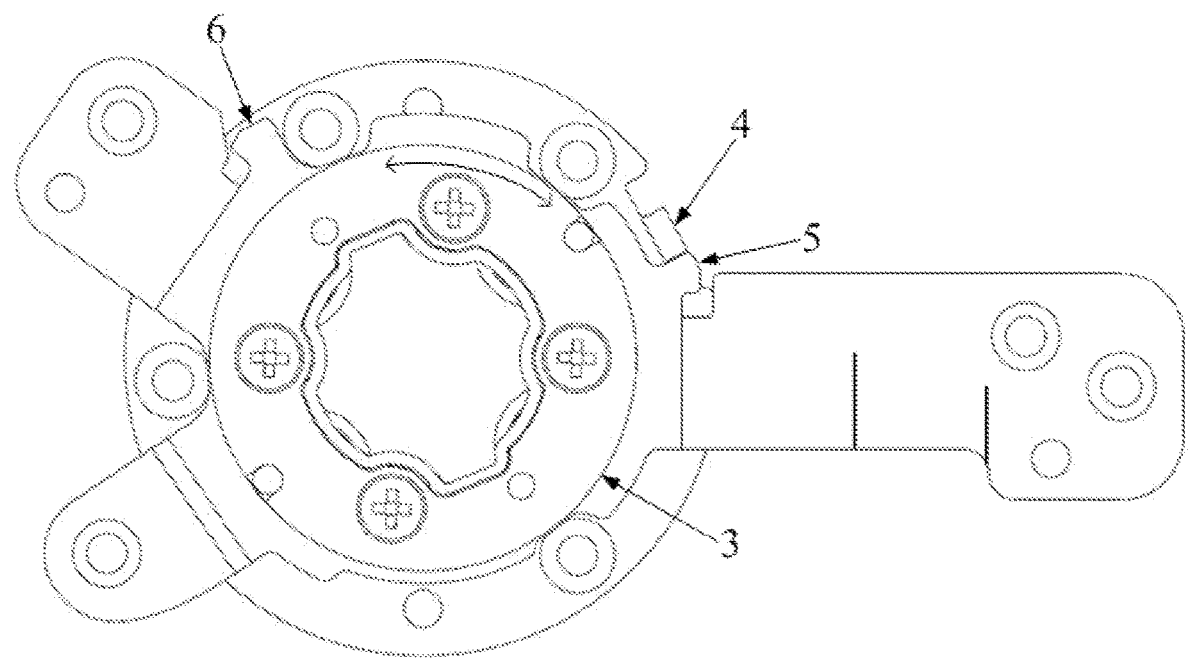
FIG. 3 is a schematic structural diagram of a cooperation between a rotating shaft and a limiting part in a first rotating shaft mechanism.

Further, as shown in FIG. 3, the first rotating shaft mechanism includes a rotating shaft 3 and a limiting part 4. The limiting part 4 may be used to limit the rotation angle of the rotating shaft 3 to enable the display screen 2 to rotate relative to the host 1 within a present angle range. In some embodiments, the limitation of the limiting part 4 on the rotating shaft 3 and/or a torque provided by the first rotating shaft mechanism to the display screen 2 may enable the display screen 2 to stay at a preset angle relative to the host 1. That is, the first rotating shaft mechanism in the present disclosure is improved on the basis of the existing structure, such that the display screen 2 may only be rotated within a preset angle range. More specifically, on the basis of the existing structure, the first rotating shaft mechanism adds a limiting part 4 for limiting the rotation of the existing rotating shaft 3. There are various options for the arrangement and structure of the limiting part 4, and there are various options for the limiting method of the rotating shaft 3. For example, the limiting part 4 may be arranged on the fixed part of the first rotating shaft mechanism that does not rotate with the rotating shaft 3, or the limiting part 4 may be fixedly arranged on the host 1 or the display screen 2. The structure of the limiting part 4 may be a stopper as shown in FIG. 3. In addition, as shown in FIG. 3, a first locking piece 5 and a second locking piece 6 may be fixedly disposed on the rotating shaft 3, and the first locking piece 5 and the second locking piece 6 may rotate synchronously with the rotating shaft 3. The first locking piece 5 and the second locking piece 6 may be spaced apart in the circumferential direction of the rotating shaft 3. At this time, the included angle between a line connecting the first locking piece 5 and the second locking piece 6 and the center of the rotating shaft 3 may be the maximum angle of the preset angle range, and the stoper may be positioned between the first locking piece 5 and the second locking piece 6. When the rotating shaft 3 rotates in the forward direction to make the first locking piece 5 approach the stopper and make contact with the stopper, as shown in FIG. 3, the stopper may block the first locking piece 5 such that the rotating shaft 3 cannot continue to rotate in the forward direction. Similarly, when the rotating shaft 3 rotates in the reverse direction to make the second locking piece 6 approach the stopper and make contact with the stopper, the stopper may block the second locking piece 6 such that the rotating shaft 3 cannot continue to rotate in the reverse, thereby realizing the rotation of the display screen 2 relative to the host 1 within the preset angle range. Alternatively, the limiting part 4 may also be a pin shaft that can expand and contract in the radial direction of the rotating shaft 3, and the rotating shaft 3 may include two grooves for allowing the pin shaft to expand into and be locked with the pin shaft. In this case, the axial angle between the two grooves may be the maximum angle of the preset angle range. When the rotating shaft 3 rotates in the forward direction to align the pin shaft with one of the grooves and enter the groove, the pin shaft may be locked with the groove, such that the rotating shaft 3 cannot continue to rotate in the forward direction. Similarly, when the rotating shaft 3 rotates in the reverse direction to align the pin shaft with another groove and enter the groove, the pin shaft may be locked with the groove, such that the rotating shaft 3 cannot continue to rotate in the reverse direction, thereby realizing the rotation of the display screen 2 relative to the host 1 within the preset angle range. After the rotating shaft 3 is blocked or stopped and stops rotating, the rotating shaft 3 and the display screen 2 connected to the rotating shaft 3 may stay at this angle, which can be achieved by the limiting force (the limiting force may refer to the blocking force between the stopper and the locking piece, and the locking force between the pin shaft and the groove), or by the torque provided by the rotating shaft mechanism itself to the display screen 2. The value of the preset angle range may be between 0° to 90° in the present disclosure, that is, the display screen 2 may be rotated within the angle range of 90°. In addition, when the display screen 2 is in the horizontal screen attitude, the angle may be 0°, and when the display screen 2 is in the vertical screen attitude, the angle may be 90°. In this way, the horizontal screen attitude and the vertical screen attitude can be respectively the positions corresponding to the two extreme values of the preset angle range. Further, the rotating shaft 3 can be blocked by the limiting part when the display screen 2 is in the horizontal screen attitude and the vertical screen attitude, which is convenient for the alignment and stop of the display screen 2 in these two positions, and provides convenience for the user's operation. In addition, the value of the preset angle range may also be other values greater than 90° or less than 90°, such that the display screen 2 can be rotated at a larger angle or can only be rotated at a smaller angle, which is not limited in the embodiments of the present disclosure.

Figure 2:
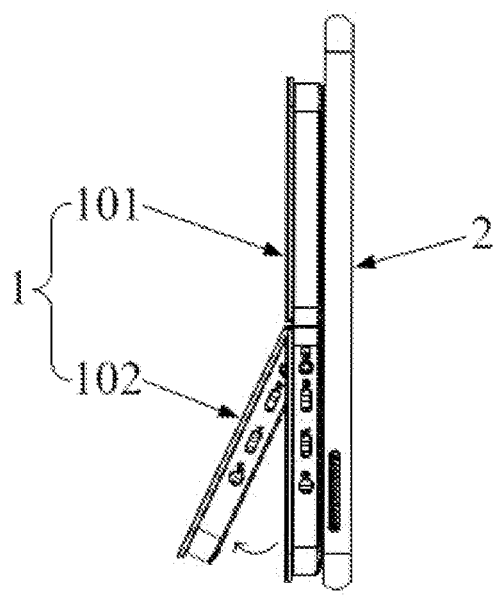
FIG. 2 is a schematic structural diagram of a relative rotation of a first body and a second body.
Figure 4:
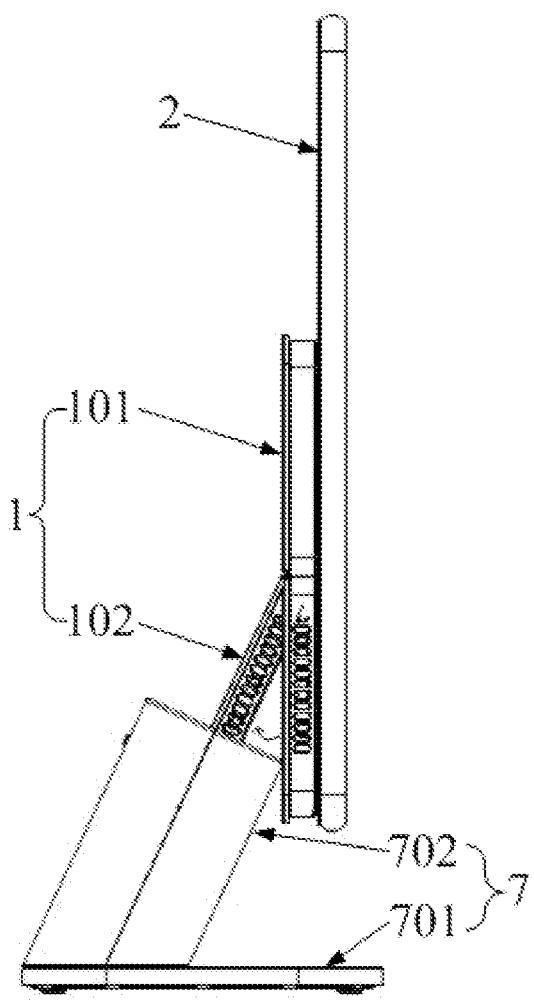
FIG. 4 is a side view of the electronic device including a base.

In some embodiments, as shown in FIG. 1, FIG. 2 and FIG. 4, the second rotating shaft mechanism is connected between a first edge of the first body 101 and a second edge of the second body 102, such that the angle between the first body 101 and the second body 102 may be changed. In some embodiments, the second body 102 and the second body 102 may both be plate-like structures, the first edge may be an edge of the first body 101 close to the second body 102, and the second edge may be an edge of the second body 102 close to the first body 101. By arranging the second rotating shaft mechanism between the two edges, the first body 101 and the second body 102 can be opened and closed similar to a laptop computer through the rotational connection of the second rotating shaft mechanism. That is, the angle between the first body 101 and the second body 102 can be changed, such that by changing the angle between the first body 101 and the second body 102, the vertical and forward-backward movement of the display screen 2 can be greatly improved, thereby further improving the support effect and position adjustment effect of the host 1 on the display screen 2. In addition, the first body 101 and the second body 102 may also be connected in a way that the first body 101 may be rotatably connected to a centerline of the second body 102 through the second rotating shaft mechanism ((i.e., the two bodies may be connected in a T-shape or a Y-shape), or the second rotating shaft mechanism may be rotatably connected to a centerline of the first body 101 and the centerline of the second body 102 (i.e., the two bodies may be connected in an X-shape).

On the basis that the second rotating shaft mechanism is arranged between the first body 101 and the second body 102, there may be various options for the setting position of the first rotating shaft mechanism. The first rotating shaft mechanism may be arranged between the display screen 2 and the first body 101 as shown in FIG. 1, FIG. 2 and FIG. 4, or the first rotating shaft mechanism may be arranged between the display screen 2 and the second body 102, or the first rotating shaft mechanism may be arranged at the connection part of the first body 101 and the second body 102. In some embodiments, when the first rotating shaft mechanism is arranged between the display screen 2 and the first body 101, that is, when the display screen 2 is rotatably arranged on the first body 101, in order to ensure that the rotation of the display screen 2 in the plane where it is positioned is not interfered by the first body 101, as shown in FIG. 1, FIG. 2 and FIG. 4, the plate-shaped first body 101 and the display screen 2 may be arranged in parallel, such that the display screen 2 may rotate parallel to the first body 101. Since by arranging the display screen 2 on the first body 101 can maximize the vertical and forward-backward movement of the display screen 2 through the relative rotation of the first body 101 and the second body 102, which makes the adjustment performance of the electronic device more prominent, therefore, in the embodiments of the present disclosure, the display screen 2 can be arranged on the first body 101 through the first rotating shaft mechanism, and the second body 102 may cooperate with the display screen 2 to form a herringbone support structure, as shown in FIG. 2. When the first rotating shaft mechanism is arranged between the display screen 2 and the second body 102, the display screen 2 may be rotatably arranged on the second body 102, and the display screen 2 may be supported by the second body 102 at this time. When the first rotating shaft mechanism is arranged at the connection part of the first body 101 and the second body 102, the display screen 2 may be arranged between the first body 101 and the second body 102. Specifically, display screen 2 may be connected to the second rotating shaft mechanism through the first rotating shaft mechanism. That is, the first rotating shaft mechanism and the second rotating shaft mechanism may be integrated into one structure, and at this time, the display screen 2 may be supported by the second body 102 alone or jointly supported by the two herringbone-shaped bodies.

In addition, in another connection method, the first rotating shaft mechanism and the second rotating shaft mechanism may be linked, such that the display screen 2 may rotate when the angle between the first body 101 and the second body 102 changes, or the display screen 2 may rotate relative to the host 1 to cause a change of the angle between first body 101 or the second body 102. That is, the first rotating shaft mechanism may be rotated to drive the second rotating shaft mechanism to rotate, or the second rotating shaft mechanism may be rotated to drive the first rotating shaft mechanism to rotated. In this way, the position and attitude of the display screen 2 can be adjusted at the same time, which is not only convenient for the user, but the corresponding relationship between the angle between the first body 101 and the second body 102 and the rotation angle of the display screen 2 can also be preset during design and manufacturing. For example, when the angle between the first body 101 and the second body 102 is 120°, the display screen 2 may be in a vertical screen attitude; and when the angle between the first body 101 and the second body 102 changes to 150°, the display screen 2 may automatically change to a horizontal screen attitude. In this way, the host 1 can support the display screen 2 in a more suitable force attitude, such that the support stability of the electronic device can be improved. In a specific structure, since the axes of the first rotating shaft mechanism and the second rotating shaft mechanism are arranged perpendicular to each other, the linkage between the first rotating shaft mechanism and the second rotating shaft mechanism may be realized by adopting a bevel gear transmission.

In the electronic device provided by the present disclosure, the host 1 may include a host sound outlet, and the display screen 2 may include a screen sound outlet. The host sound outlet and the screen sound outlet may be arranged in a circular array or in other arrays. The sound outlets on the host 1 and the display screen 2 may be arranged in a circular array, which can improve the sound output effect of the electronic device, such that the electronic device can have sound output effects such as stereo sound effect and surround sound effect. More specifically, the sound outlet of the display screen 2 may be set at the bottom or the top, where the bottom may refer to the end of the display screen 2 that is close to the supporting surface when the display screen 2 is in a vertical screen attitude, and the top may refer to the end of the display screen 2 opposite to the bottom. When the display screen 2 is switched to the horizontal screen attitude, the bottom or the top will be close to the side of the first body 101. If the host sound outlet is arranged on this side of the first body 101, the circular array cannot be formed. Therefore, the host sound outlet may not be arranged on this side of the first body 101. Based on this, the host sound outlet may be arranged on the other side of the first body 101 or on the second body 102. At the same time, the host 1 may also control the switching of the working state of a host sound port and a screen sound port. For example, when the user does not have high requirements for the sound output effect, such as when using the electronic device to take an online course, the voice of the course content may be output under the control of the host 1 using only the host sound port or the screen sound port. When the electronic device plays music, since the user has relatively high requirements for the sound output effects, the host 1 may control the host sound outlet and the screen sound outlet to simultaneously output sound to form stereo sound effects and/or surround sound effects.

In addition, a heat dissipation port may be arranged on the host 1, and an audio acquisition module may be arranged on the display screen 2. The heat dissipation port may be arranged away from the audio acquisition module. In some application scenarios, the user needs to interact with the electronic device, such as when a student needs to answer questions during online classes. Therefore, in the embodiments of the present disclosure, an audio acquisition module, such as a microphone, may be included in the electronic device. At the same time, in order to ensure the normal heat dissipation of the electronic device, a heat dissipation port needs to be arranged on the host 1. If the audio acquisition module on the display screen 2 is close to the heat dissipation port when the display screen 2 is in a specific attitude and/or position, the airflow discharged from the heat dissipation port may have an impact on the sound collection effect of the audio acquisition module. Therefore, in the present disclosure, the heat dissipation port may be arranged away from the audio acquisition module to avoid the impact on the sound collection effect. More specifically, on the basis that the display screen 2 is arranged on the first body 101, the audio acquisition module may be arranged on the top of the display screen 2 described above, and the heat dissipation port may be arranged on the end of the second body 102 away from the first body 101 and on a side surface of the end away from the display screen 2.

Further, the first body 101 may be positioned on top of the second body 102 and connected to the display screen 2. The first body 101 may include a battery and a speaker, and the second body 102 may include a motherboard and a fan. In the embodiments of the present disclosure, since the host 1 is divided into two parts, it may be needed to distribute the electronic components provided in the host 1 between the first body 101 and the second body 102. In some embodiments, the battery and speaker may be disposed in the first body 101 at the top, and other electronic components such as the motherboard, fan, hard disk, Wi-Fi module, etc. may be disposed I the second body 102 at the bottom. This distribution method can make the electronic device more reasonably arranged in the host 1, and can also reasonably distribute the weight of the first body 101 and the second body 102, such that the supporting effect of the host 1 can be improved. In addition, some electronic components such as the hard disk, Wi-Fi module, etc. disposed in the second body 102 may also be disposed in a base 7 that will be described below.

As shown in FIG. 4 to FIG. 6, the electronic device further includes a base 7. The second body 102 may be arranged on the base 7 to realize the support of the first body 101 and the display screen 2. By adding the base 7 and disposing the second body 102 on the base 7, the support stability of the display screen 2 can be further improved, such that the position change and the attitude switch of the display screen 2 can be performed more reliably. More specifically, the base 7 may include a bottom plate 701 and a connecting body 702 disposed on the top of the bottom plate 701. The second body 102 may be detachably connected to the connecting body 702 to realize the arrangement of the host 1 and the display screen 2 on the base 7. In some embodiments, the bottom plate 701 may be a part for contacting with the supporting surface (such as a desktop, the ground, etc.). Because of its plate-like structure, the bottom plate 701 can have a larger contact area with the supporting surface, which enables the host 1 and the display screen 2 to be stably supported on the base. The connecting body 702 may be a part that supports the host 1 and the display screen 2 to a certain height, and its shape may be an elliptical column as shown in FIG. 4 to FIG. 6. At the same time, as shown in FIG. 4, the connecting body 702 is inclined relative to the bottom plate 701. For example, the axis of the elliptical column and the bottom plate 701 may have an included angle of 45°, 60°, etc. In this way, the convenience of arranging the host 1 and the display screen 2 on the base, the comfort of the user, and the stability of the base supporting the host 1 and the display screen 2 can be improved.

At the same time, a plurality of electronic components may be disposed on the base 7. The second body 102 may be detachably connected to the base 7 through a mechanical connection structure, and the second body 102 may be electrically connected to the plurality of electronic components through an electrical connection part while being mechanically connected. With this arrangement, the base 7 can not only play the role of support, but can also assist the host 1 and/or the display screen 2 to operate, thereby enriching the functions of the electronic device and/or optimizing the performance of the electronic device. In some embodiments, the mechanical connection structure may be a slot disposed on the base 7, and the second body 102 may be mechanically connected to the base 7 by being inserted into the slot. When the slot is disposed on the base 7, the slot may be disposed on the top wall of the connecting body 702 which may be inclined relative to the connecting body 702, thereby facilitating the user to plug and unplug the host 1 and the display screen 2. The electrical connection part may be a pogo pin set in the slot. After the second body 102 is inserted and locked into the slot, the second body 102 can be in contact with the pogo pin and be in electrical conduction, such that the electronic components provided in the base 7 can perform auxiliary work. In addition, the base 7 and the second body 102 may also be limited to realize the mechanical connection between the host 1 and the base 7. That is, the base 7 may only include the slot without the electrical connection part. In this case, the electrical and communication connection between the second body 102 and the electronic components in the base 7 may be realized by means of wireless connection, that is, wireless charging and/or wireless communication may be performed. More specifically, the electronic components disposed on the base 7 may include one or more of an image acquisition module, a receiving slot, and a function adjustment button. In some embodiments, the image acquisition module may be used for shooting exercises or users, the receiving slot may be used for receiving a touch pen for touching the display screen 2, and the function adjustment button may include one or more of a switch button, a volume adjustment button, and/or a light brightness adjustment button.

In the present disclosure, the structure of each part is described in a progressive manner, and each the structure of each part focuses on the differences from the existing structure. The entire and partial structures of the electronic device can be obtained by combining the structures of the various parts described above.

Specific embodiments of the present disclosure are described above. However, the scope of the present disclosure is not limited to these specific embodiments. Any person skilled in the art can easily think of changes or replacements within the technical scope disclosed in the present disclosure. These changes or replacements should be within the scope of the present disclosure. Therefore, the scope of the present invention shall be subject to the scope of the claims.

What is claimed is:

1. An electronic device comprising:
a host including a first body and a second body, the first body being located on a top of the second body, the first body being rotatably connected to the second body, the first body including a battery and a speaker, and the second body including a motherboard, a fan, and a heat dissipation port; and
a display screen rotatably connected to the host and configured to display to-be-output content output by the host;
wherein:
the display screen is rotatably connected to the host through the first body or the second body;
a size of the display screen is larger than a size of the host;
the host and the display screen are rotatably connected through a first rotating shaft mechanism, an axis of the first rotating shaft mechanism and the display screen satisfying a vertical condition;
the first body and the second body are rotatably connected by a second rotating shaft mechanism, an axis of the second rotating shaft mechanism and the display screen satisfying a parallel condition; and
a host sound outlet is arranged on the host, a screen sound outlet is arranged on the display screen, and the host sound outlet and the screen sound outlet are arranged in a circular array.

2. The electronic device of claim 1, wherein:
the first rotating shaft mechanism includes a rotating shaft and a limiting part, the limiting part being configured to limit a rotation angle of the rotating shaft to cause the display screen to rotate relative to the host within a preset angle range, the limit on the rotating shaft by the limiting part and/or a torque provided by the first rotating shaft mechanism to the display screen being used to cause the display screen to stay at a preset angle relative to the host.

3. The electronic device of claim 1, wherein:
the second rotating shaft mechanism is connected between a first edge of the first body and a second edge of the second body to cause an angle between the first body and the second body to be changeable; and
the first rotating shaft mechanism is arranged between the display screen and the first body, or the first rotating shaft mechanism is arranged between the display screen and the second body, or the first rotating shaft mechanism is arranged at a connection part of the first body and the second body.

4. The electronic device of claim 1, wherein:
the first rotating shaft mechanism and the second rotating shaft mechanism are linked to cause the display screen to rotate while the angle between the first body and the second body changes, or to cause the angle between the first body and the second body to change while the display screen rotate relative to the host.

5. The electronic device of claim 3, wherein:
the first rotating shaft mechanism and the second rotating shaft mechanism are linked to cause the display screen to rotate while the angle between the first body and the second body changes, or to cause the angle between the first body and the second body to change while the display screen rotate relative to the host.

6. The electronic device of claim 1, wherein:
an audio acquisition module is arranged on the display screen, and the heat dissipation port is arranged away from the audio acquisition module.

7. The electronic device of claim 1, wherein:
the first body is connected to the display screen.

8. The electronic device of claim 1 further comprising:
a base, the second body being disposed on the base to support the first body and the display screen.

9. The electronic device of claim 8, wherein:
the base includes a plurality of electronic components and the second body and the base are detachably connected through a mechanical connection structure, the second body and the base being electrically connected to the plurality of electronic components through an electrical connection part while being mechanically connected.

10. The electronic device of claim 2, wherein:
a first locking piece and a second locking piece are fixedly disposed on the rotating shaft, the first locking piece and the second locking piece being configured to rotate synchronously with the rotating shaft, and the first locking piece and the second locking piece being spaced apart in a circumferential direction of the rotating shaft.

11. The electronic device of claim 10, wherein the limiting part includes a stopper positioned between the first locking piece and the second locking piece and configured to:
in response to the rotating shaft rotating in a first direction to cause the first locking piece to approach and contact the stopper, block the first locking piece to prevent the rotating shaft from continuing to rotate in the first direction; and in response to the rotating shaft rotating in a second direction to cause the second locking piece to approach and contact the stopper, block the second locking piece to prevent the rotating shaft from continuing to rotate in the second direction.

12. The electronic device of claim 10, wherein:

the limiting part includes a pin shaft, the pin shaft being configured to expand and contract in a radial direction of the rotating shaft;

the rotating shaft includes a first groove and a second groove for allowing the pin shaft to expand into and configured to be locked with the pin shaft; and the pin shaft is configured to:

in response to the rotating shaft rotating in a first direction to cause the pin shaft to align with the first groove and enter the first groove, be locked with the first groove to prevent the rotating shaft from continuing to rotate in the first direction; and in response to the rotating shaft rotating in a second direction to cause the pin shaft to align with the second groove and enter the second groove, be locked with the second groove to prevent the rotating shaft from continuing to rotate in the second direction.

* * * * *